United States Patent
Sabouri-Sichani et al.

(10) Patent No.: US 12,507,133 B2
(45) Date of Patent: Dec. 23, 2025

(54) ROLE MANAGEMENT IN RELAY COMMUNICATION

(71) Applicant: NOKIA TECHNOLOGIES OY, Espoo (FI)

(72) Inventors: Faranaz Sabouri-Sichani, Aalborg (DK); Lianghai Ji, Aalborg (DK); Ling Yu, Kauniainen (FI); Vinh Van Phan, Oulu (FI); Rudraksh Shrivastava, Erligheim (DE); Sudeep Hegde, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 389 days.

(21) Appl. No.: 18/020,786

(22) PCT Filed: Jul. 22, 2021

(86) PCT No.: PCT/EP2021/070550
§ 371 (c)(1),
(2) Date: Feb. 10, 2023

(87) PCT Pub. No.: WO2022/033834
PCT Pub. Date: Feb. 17, 2022

(65) Prior Publication Data
US 2024/0040445 A1  Feb. 1, 2024

(30) Foreign Application Priority Data
Aug. 14, 2020 (EP) .................................. 20191037

(51) Int. Cl.
*H04W 36/00* (2009.01)
(52) U.S. Cl.
CPC ..... *H04W 36/0058* (2018.08); *H04W 36/033* (2023.05)

(58) Field of Classification Search
CPC ........... H04W 36/0058; H04W 36/033; H04W 88/04
See application file for complete search history.

(56) References Cited

U.S. PATENT DOCUMENTS

2013/0208584 A1* 8/2013 Kim ...................... H04W 72/30
370/312
2015/0327204 A1* 11/2015 Park ...................... H04W 24/10
370/350

(Continued)

FOREIGN PATENT DOCUMENTS

CN 104604291 A 5/2015
CN 107637162 A 1/2018

OTHER PUBLICATIONS

International Search Report and Written Opinion dated Oct. 1, 2021 corresponding to International Patent Application No. PCT/EP2021/070550.

(Continued)

*Primary Examiner* — Hoang-Chuong Q Vu
(74) *Attorney, Agent, or Firm* — Barta Jones, PLLC (57) ABSTRACT

An arrangement for role management in relay communication is disclosed. In relay communication, one user equipment relays communication between a base station and at least one remote user equipment. Initially, the relay user equipment has a better signal to a base station. When the signal changes, a better signal channel may be achieved by switching roles between a relay user equipment and a remote user equipment. This includes detecting that a better signal exists and determining that a change would provide a better signal.

7 Claims, 6 Drawing Sheets

(56) References Cited

U.S. PATENT DOCUMENTS

| | | |
|---|---|---|
| 2016/0021594 A1 | 1/2016 | Yilmaz et al. |
| 2018/0255505 A1 | 9/2018 | Thyagarajan et al. |
| 2018/0343598 A1 | 11/2018 | Xu et al. |
| 2019/0116586 A1 | 4/2019 | Basu Mallick et al. |
| 2019/0223066 A1* | 7/2019 | Xu .................... H04W 36/0058 |
| 2019/0239132 A1 | 8/2019 | Wallentin et al. |
| 2019/0289520 A1 | 9/2019 | Xu et al. |
| 2019/0335370 A1 | 10/2019 | Kumar et al. |
| 2020/0196372 A1 | 6/2020 | Ouyang et al. |
| 2020/0213958 A1* | 7/2020 | Goyal .................. H04L 5/0055 |
| 2020/0314914 A1* | 10/2020 | Roy .................. H04B 7/18523 |
| 2021/0045093 A1* | 2/2021 | Rao ....................... H04W 76/14 |
| 2021/0144781 A1* | 5/2021 | Xu ......................... H04W 24/02 |
| 2021/0243713 A1* | 8/2021 | Ellenbeck ........... H04W 56/002 |
| 2021/0368360 A1* | 11/2021 | Akl ....................... H04W 92/20 |
| 2023/0318941 A1* | 10/2023 | Rune .................. H04L 41/5009 370/252 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; Study on further enhancements to LTE Device to Device (D2D), User Equipment (UE) to network relays for Internet of Things (IoT) and wearables; (Release 15)", 3GPP TR 36.746, V15.1.1, Apr. 2018, pp. 1-55.

"New SID: Study on NR sidelink relay", 3GPP TSG RAN Meeting #86, RP-193253, Agenda Item: 9.1.2, OPPO, Dec. 9-12, 2019, pp. 1-5.

"New WID on NR sidelink enhancement", 3GPP TSG RAN Meeting #86, RP-193231, Agenda Item: 9.1.1, LG Electronics, Dec. 9-12, 2019, 6 pages.

Barua et al., "A novel approach of mobility management for the D2D communications in 5G mobile cellular network system", 18th Asia-Pacific Network Operations and Management Symposium (APNOMS), Oct. 5-7, 2016, 4 pages.

Yilmaz et al., "Smart mobility management for D2D communications in 5G networks", IEEE Wireless Communications and Networking Conference Workshops (WCNCW), Apr. 6-9, 2014, pp. 219-223.

"UE to Network Relay Link Handling during Remote UE's Mobility", 3GPP TSG RAN WG2 Meeting #89bis, R2-151233, Agenda Item: 7.5.2, CATT, Apr. 20-24, 2015, pp. 1-4.

Extended European Search Report received for corresponding European Patent Application No. 20191037.9, dated Jan. 27, 2021, 7 pages.

Office Action received for corresponding European Patent Application No. 20191037.9, dated May 17, 2024, 4 pages.

Office Action received for corresponding Chinese Patent Application No. 202180055664.6, dated Apr. 11, 2025, 10 pages of Office Action and no page of translation available.

* cited by examiner

ROLE MANAGEMENT IN RELAY COMMUNICATION

DESCRIPTION OF BACKGROUND

The following disclosure relates to wireless communication systems. More specifically the following disclosure relates to role switching in relay assisted communications.

In modern telecommunication networks, such as LTE (Long Term Evolution) and 5G, UE (User Equipment) relaying is used for extending the coverage of the network. This is also called side link relay or side link communication. When relaying, a user equipment acts as a relaying device for one or more remote user equipment. A remote user equipment is a user equipment that is connected to the network through the relaying user equipment, for example, when it would otherwise be out of the network coverage. In relay assisted communications the relaying user equipment has a better radio link connection than the remote user equipment that is communicating with the base station indirectly through the relaying user equipment. Thus, the remote user equipment may communicate even if it was out of the base station coverage.

The conditions, however, are varying because mobile devices move in relation to each other and base stations. For example, the relaying user equipment may move out of the base station coverage.

SUMMARY

An arrangement for role management in relay communication is disclosed. In relay communication, one user equipment relays communication between a base station and at least one remote user equipment. Initially, the relay user equipment has a better signal to a base station. When the signal changes, a better communication may be achieved by switching roles between a relay user equipment and a remote user equipment. This includes detecting that a better signal exists and determining that a change would provide a better signal.

In an aspect an apparatus comprises at least one processor and at least one memory including computer program code. The at least one memory and the computer program code being configured to, with the at least one processor, cause the apparatus to measure at least one first value; receive at least one second measured value from a remote user equipment relayed by the user equipment; evaluate a condition for a role switch between the user equipment and the remote user equipment based on the measured at least one first value and the received at least one second measured value; transmit a measurement report to a base station when the evaluation indicates a condition for a role switch between the user equipment and the remote user equipment; and receive a role switch command from the base station.

It is beneficial to define conditions for measurement reporting so that the base station can decide on role switching. When the role switching is done in a controlled manner the user equipment using relay communication will get increased quality of service when the uncontrolled drops in the service are reduced.

In an embodiment the at least one memory and the computer program code is further configured to, with the at least one processor, cause the user equipment to transmit the measured at least one first value and the received at least one second measured value in the measurement report.

It is beneficial to transmit the measured at least one first value and the received at least one second measured value in the measurement report so that the base station can use them in the decision making process.

In an embodiment the at least one memory and the computer program code is further configured to, with the at least one processor, cause the user equipment to receive configuration information, wherein the configuration information comprises at least one parameter for evaluating a condition for a role switch between the user equipment and the remote user equipment.

It is beneficial to receive the configuration information so that the user equipment can appropriately evaluate if there is a need for a role switch in a configurable manner.

In an embodiment the at least one memory and the computer program code is further configured to, with the at least one processor, cause the user equipment to transmit a request to a remote user equipment to report at least one measured value to the user equipment; and to receive the at least one second measured value as a response to the request.

It is beneficial that the relay user equipment can be used to request measurements from one or more remote user equipment and use these measurement results in the evaluation.

In an embodiment the at least one first and second measured values include at least one of the following: a measured power or quality of a reference signal of a serving cell; and a measured power or quality of a reference signal of a neighboring cell.

In an embodiment the evaluation indicates a condition for a role switch between the user equipment and the remote user equipment when a measured value of a serving cell performed by the remote user equipment is offset better than a measured value of the serving cell performed by the user equipment.

In an embodiment the evaluation indicates a condition for a role switch between the user equipment and the remote user equipment and for a combined handover of the user equipment and the remote user equipment towards a neighboring cell when a measured value of the neighboring cell performed by the remote user equipment is offset better than a measured value of a serving cell performed by the user equipment, and when a measured value of the neighboring cell performed by the remote user equipment is offset better than a measured value of the neighboring cell performed by the user equipment.

In an aspect a method for a user equipment is disclosed. The method comprises measuring at least one first value; receiving at least one second measured value from a remote user equipment relayed by the user equipment; evaluating a condition for a role switch between the user equipment and the remote user equipment based on the measured at least one first value and the received at least one second measured value; transmitting a measurement report to a base station when the evaluation indicates a condition for a role switch between the user equipment and the remote user equipment; and receiving a role switch command from the base station.

In an aspect a network element is disclosed. The network element comprises at least one processor; and at least one memory including computer program code, the at least one memory and the computer program code being configured to, with the at least one processor, cause the network element to: transmit configuration information to a user equipment, the configuration information comprising at least one parameter for evaluating a condition for a role switch between the user equipment and a remote user equipment relayed by the user equipment based on values measured by the user equipment and the remote user equipment; receive a measurement report from the user equipment indicating a condition for a role switch between the user equipment and the remote user equipment; and transmit a role switch command to the user equipment and the remote user equipment.

It beneficial to transmit configuration information to a user equipment relaying a remote user equipment including at least one parameter related to a role switch condition, or role switch trigger event, between the user equipment and the remote user equipment so that the user equipment can detect a need for role switching based on its own measurements and on the measurements gathered from the remote user equipment. When the role switching is done in a controlled and configurable manner the user equipment using relay communications will get increased quality of service when the uncontrolled drops in the service are reduced.

In an embodiment the at least one memory and the computer program code is further configured to, with the at least one processor, cause the network element to receive at least one first value measured by the user equipment and at least one second value measured by the remote user equipment in the measurement report.

It is beneficial to receive at least one first value measured by the user equipment and at least one second value measured by the remote user equipment in the measurement report so that the base station can use them in the decision making process.

In an embodiment the at least one memory and the computer program code is further configured to, with the at least one processor, cause the network element to: transmit a combined role switch command to the user equipment and the remote user equipment; or concomitantly transmit separate role switch commands to the user equipment and the remote user equipment.

In an embodiment the measurement report further indicates a condition for a combined handover of the user equipment and the remote user equipment towards a neighboring cell, the at least one memory and the computer program code is further configured to, with the at least one processor, cause the network element to transmit a request for a combined handover to a target base station operating the neighboring cell.

In an embodiment the at least one memory and the computer program code is further configured to, with the at least one processor, cause the network element to: receive an acknowledgement to the request; and transmit a connection reconfiguration message to the user equipment and the remote user equipment in accordance with the received acknowledgement, wherein the acknowledgment comprises respective handover commands for the user equipment and the remote user equipment, and sidelink resources for sidelink communication between the user equipment and the remote user equipment.

In an aspect a method for a network element is disclosed. The method comprises transmitting configuration information to a user equipment, the configuration information comprising at least one parameter for evaluating a condition for a role switch between the user equipment and a remote user equipment relayed by the user equipment based on values measured by the user equipment and the remote user equipment; receiving a measurement report from a user equipment indicating a condition for a role switch between the user equipment and the remote user equipment; and transmitting a role switch command to the user equipment and the remote user equipment.

In an aspect a network element is disclosed. The network element comprises at least one processor; and at least one memory including computer program code, the at least one memory and the computer program code being configured to, with the at least one processor, cause the network element to: receive from a base station a request for a combined handover of a user equipment and a remote user equipment relayed by the user equipment towards a neighboring cell operated by the network element, wherein the base station is a network element as described above; transmit an acknowledgement comprising respective handover commands for the user equipment and the remote user equipment, and sidelink resources for sidelink communication between the user equipment and the remote user equipment.

BRIEF DESCRIPTION OF THE DRAWINGS

The accompanying drawings, which are included to provide a further understanding of the role management in relay communication and constitute a part of this specification, illustrate examples and together with the description help to explain the principles of the role management in relay communication. In the drawings.

DETAILED DESCRIPTION

Reference will now be made in detail to the example embodiments, examples of which are illustrated in the accompanying drawings.

The following example relates to role switching in telecommunications in general. The example particularly refers to Long Term Evolution (LTE) and to fifth generation (5G) mobile telecommunication network technology, also known as New Radio (NR). Even if LTE and 5G are used as examples, the principles disclosed may be used in different cellular radio implementations. In the following disclosure role switching will be discussed. This relates to a situation, wherein an earlier relay user equipment is configured as a remote user equipment configured to communicate with the network element using the earlier remote user equipment as a relay user equipment.

FIGS. 1a-1d explain the basic setting and the terminology used in the following disclosure. In FIGS. 1a-1d cars are shown as examples of user equipment, however it should be understood that the user equipment may be the car itself or a mobile device inside the car belonging to passengers.

Figure 1A:
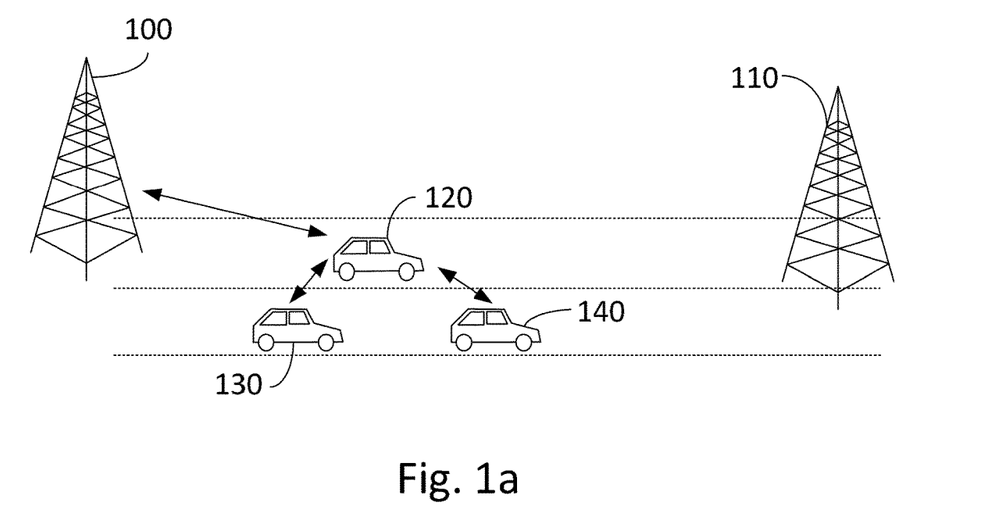
FIG. 1a is an example view explaining role switching in general.

In the example of FIG. 1a, a first base station 100 is serving a first user equipment 120. The first user equipment 120 is relaying the service to a second user equipment 130 and a third user equipment 140, which are remote user equipment.

In the example of FIG. 1, the used network may be LTE (Long Term Evolution). Thus, the base station 100 is an eNodeB. The used network may also be 5G, in which case the base station 100 is a gNodeB. In the following disclosure, a base station is used to mean, for example, an eNodeB, gNodeB, or a similar component if a different network technology is used.

Figure 1B:
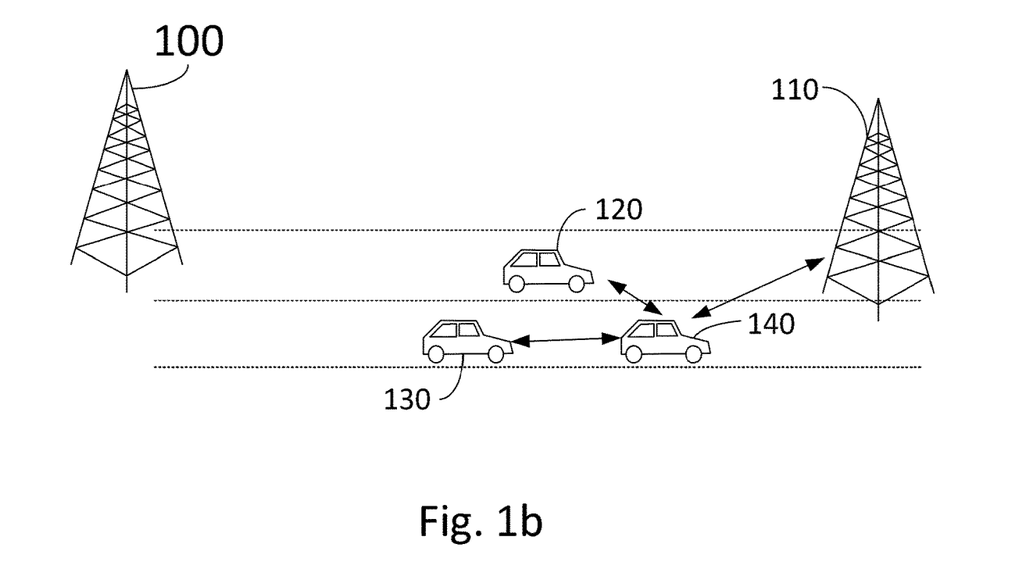
FIG. 1b is an example view explaining role switching in general.
Figure 1C:
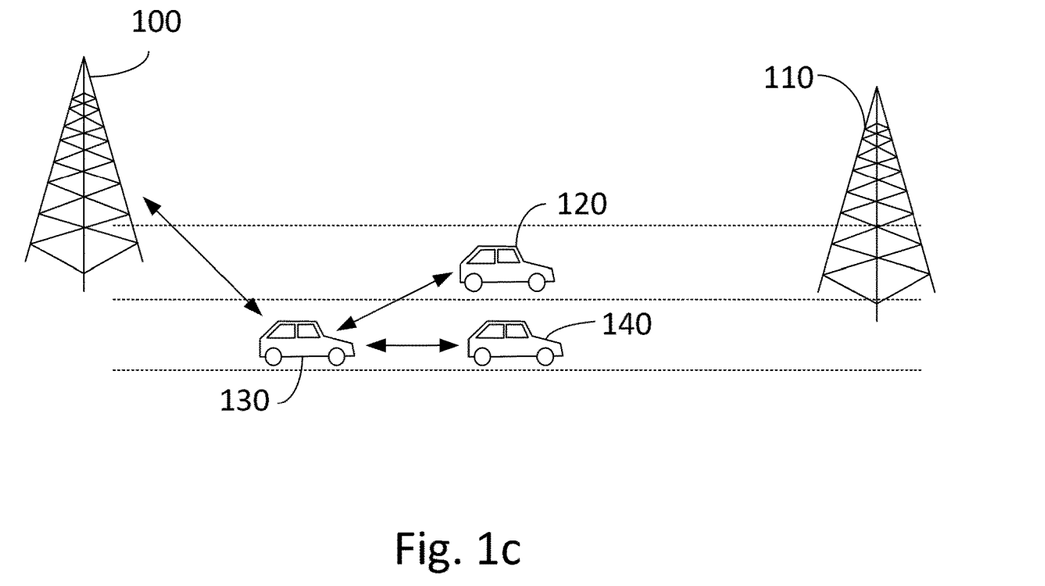
FIG. 1c is an example view explaining role switching in general.

It is noted that shown examples only serve to illustrate a possible scenario, and it does not restrict the user equipment to be only a car and/or a passenger inside case. The example of FIG. 1b further comprises using a second base station 110, as the example of FIG. 1b shows a situation after a role switch involving a handover. However, the role switching as described below may be performed also in an intra-cell manner so that the serving base station does not change. One example of end result of such a role switch is shown in FIG. 1c. In the example of FIG. 1a, cars are moving to the same direction with a relatively similar speed. This scenario is only one example, and the role switching may be also applied when the user equipment move at different speeds and even in different directions.

In the example of FIG. 1a the first user equipment 120 communicates with the base station 100. In the example of FIG. 1a, three user equipment have been configured so that the first user equipment 120 is relaying communications between the second user equipment 130 and the base station 100, as well as between the third user equipment 140 and the base station 100. A user equipment, whose traffic with network is relayed via another user equipment, is referred as a remote user equipment. As shown in FIG. 1a, when the relay user equipment 120 has been set up for the first user equipment 130 and the second user equipment 140, the first user equipment 120 may have the best radio link connection to the base station 100.

In the example of FIG. 1b the situation has changed so that the user equipment has moved closer to a second base station 110 operating a neighboring cell. Thus, they have ended up in a situation wherein the radio link connection between the third user equipment 140 and the second base station 110 is better than the radio link connection between the first user equipment 120 and the first base station 100. As a consequence, the radio link condition between each user equipment and the base station has been changed so that the third user equipment 140 is now the relaying user equipment toward the base station 110. The first user equipment 120 and the second user equipment 130 are now remote user equipment.

The process in the example of FIG. 1a toward 1b may involve a handover.

In FIG. 1c a different scenario starting from FIG. 1a is shown. In the example of FIG. 1c, the first user equipment 120, the second user equipment 130, and the third user equipment 140 have moved such that the best radio link available is now between the second user equipment 130 and the first base station 100, which is the current serving base station. This causes role switching so that the second user equipment 130 is now the relaying user equipment for the user equipment 120 and 140. The first user equipment 120 and the third user equipment 140 are now remote user equipment. As the radio link connection between the second user equipment 130 and the first base station 100 is better than the radio link between other user equipment 120, 140 and the second base station 110, the handover process is not needed.

Figure 1D:
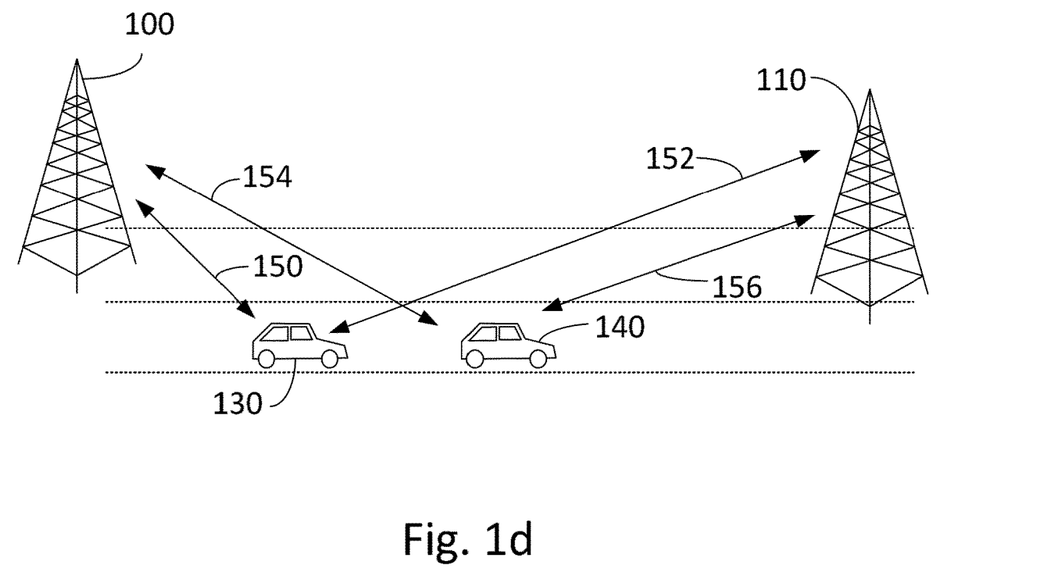
FIG. 1d is an example view explaining terminology in the following examples.

FIG. 1d is provided here for supporting the understanding of the following disclosure, which uses the power or strength of a reference signal broadcast or unicast within the cell, such as a Synchronization Signal Block (SSB), or a Channel State Information Reference Signal (CSI-RS), as a decisive measure, however, also other measures may be used, such as, signal quality (e.g., SNR), traffic load, device battery level, and similar.

FIG. 1d shows the communication channels discussed in the following examples and also in the claims. As in the example above, in the illustration of FIG. 1d the base station 100 is the serving base station and the base station 110 is a second base station operating a neighboring cell. The measured power over the connection 150 is in the following examples value $P\_s\_UE1$. Furthermore, it is an example of a first measured value of the claims, when signal properties of the communication channel between the serving base station 100 and the user equipment 130 is used as a decisive measure. The measured power over the connection 152 is in the following examples value $P\_n\_UE1$. Furthermore, it is also an example of a first measured value of the claims, when signal properties of the communication channel between the second base station 110 and the user equipment 130 is used as a decisive measure. The connection measured power over the connection 154 is in the following examples value $P\_s\_UE2$. Furthermore, it is an example of a second measured value of the claims, when signal properties of the communication channel between the serving base station 100 and the user equipment 140 is used as a decisive measure. The measured power over the connection 156 is in the following examples value $P\_n\_UE2$. Furthermore, it is an example of a second measured value of the claims, when signal properties of the communication channel between the second base station 110 and the user equipment 140 is used as a decisive measure. As mentioned above, these values are purely examples and intended only to provide easier understanding of the following disclosure.

Figure 2:
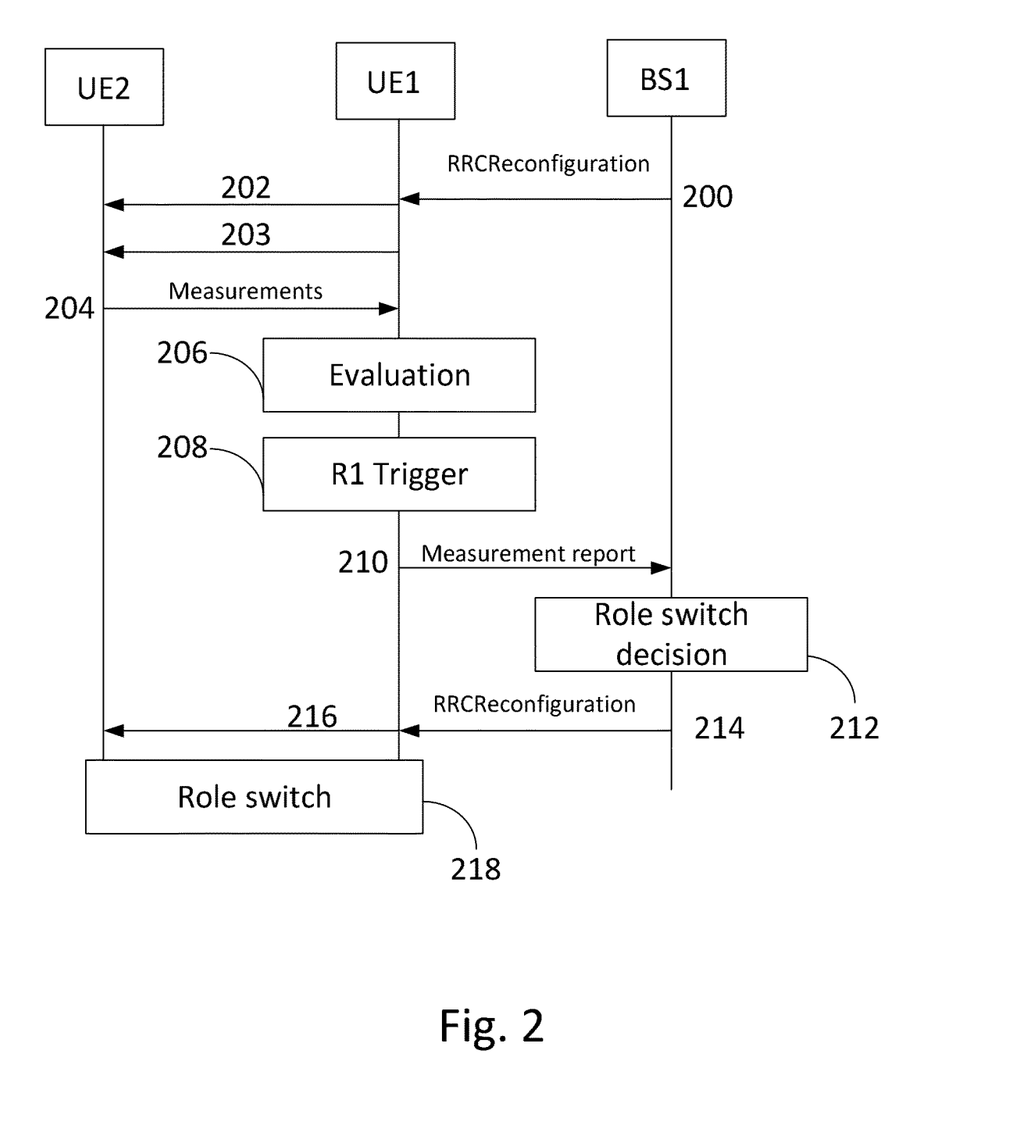
FIG. 2 is an example of a signaling chart illustrating intra-cell role switching.

FIG. 2 shows an example of a signaling chart illustrating intra-cell role switching. The process begins with an RRCReconfiguration message 200 from the base station to UE1, which message may be then forwarded to UE2, 202. The message includes configures the measurement reporting trigger events R1 and/or R2. Furthermore, the message 202 may include configuration for periodical or event-based reporting.

In the example of FIG. 2 Event R1 means that the serving base station becomes better for a remote UE compared to the current relay UE. As an example, event R1 may be set as $P\_s\_UE2 > P\_s\_UE1 + offset1$, wherein offset1 is an offset parameter with a positive (possibly null) value. The offset may be used in order to reduce the number of role switches. The effect of the offset is that the change is only applied when the difference is significant. Thus, a second role switch back to the earlier is unlikely. The level of the offset, if it is used, may be determined by the network operator.

Event R2 means that a neighboring base station becomes better for the remote UE compared to the serving base station, while no neighboring base stations is better than the serving base station for the relay UE. As an example, event R2 may be set as $P\_n\_UE2 > P\_s\_UE1 + offset2$ and $P\_s\_UE1 > P\_n(any)\_UE1 + offset3$, wherein again offset2 and offset3 are offset parameters with a positive (possibly null) value, and wherein $P\_n(any)$ UE1 represents the relay UE's measurement on any neighbor cell. Furthermore, offset2 value is typically higher than offset3 value.

Alternatively, event R2 may be triggered when the serving base station becomes offset better for a remote UE compared to the current relay UE, i.e. when $P\_n\_UE2 > P\_s\_UE1 + offset2$, and when the neighboring cell becomes offset better for the remote UE compared to the current relay UE, i.e. when $P\_n\_UE2 > P\_n\_UE1 + offset4$, wherein again offset4 is an offset parameter with a positive (possibly null) value.

UE2, which is the remote user equipment, is configured to perform measurement(s), e.g. including measuring the radio interface between the remote user equipment and the base station serving UE2, and/or between the remote user equipment and one or more neighboring cells, denoted by P_s_UE2 and P_n_UE2 respectively. The measurement and reporting may be done using periodical or event-triggered reporting as configured by the network, which measurement report being decoded by UE1 to fetch the measured values from UE2 for evaluation of R1 and/or R2 conditions.

Alternatively, the UE1 may transmit a request to report one or more measured values related to the serving cell and/or one or more neighboring cells using a signal 203. If the UE1 transmits the optional message 203, the message may contain just a request to report the latest measured values, or an explicit request to measure and periodically report current values. The requested measurements are typically L3 measurements used for evaluating a condition for a role switch between the remote user equipment and the relay user equipment (possibly with a combined handover). Alternatively, the reported measurements may be L1 measurements, in which case some further L3 filtering is carried out at the relay user equipment before evaluating the condition. Furthermore, these L3 or L1 measurements may comprise some time stamps or alike so as the relay user equipment can determine the relevant set of measurements of the remote user equipment to use when evaluating the condition. Still furthermore, and in order to reduce the signaling load over the sidelink interface, the remote user equipment may start reporting these L3 or L1 measurements to the relay user equipment after a given condition is fulfilled, such as when the signal level of the serving cell as measured by the current relay user equipment, namely P_s_UE1, drops below a certain threshold.

The measurement result(s) are then sent to UE1, 204. UE1 performs the same measurement(s) and evaluates, 206, the received measurements in order to detect if conditions for R1 and/or R2 measurement reporting triggers are met. In another example, based on UE1's measurement of the Uu interface with its serving cell and/or neighboring cell(s), UE1 may fetch the required Uu measurement at UE2 to trigger R1 and/or R2.

In the example of FIG. 2, the conditions for R1 have been met and R1 measurement reporting is triggered accordingly, 208. Then, a combined measurement report 210 is sent to the base station. The measurement report may include P_s_UE1 and P_s_UE2 values. However, instead of reporting the values, only an indication indicating that the condition is met can be sent to the base station. Based on the received information, the base station decides to make a role switch, 212. In one example, this is done by transmitting a single RRCReconfiguration message 214 to UE1, which forwards it 216 to UE2, or by sending two separate RRCReconfiguration messages concomitantly to UE1 and (through UE1) to UE2 respectively. Finally, the actual role switch is performed, 218. At the end of the signaling, UE2 is the new relay user equipment, and UE1 is the new remote user equipment.

Figure 3:
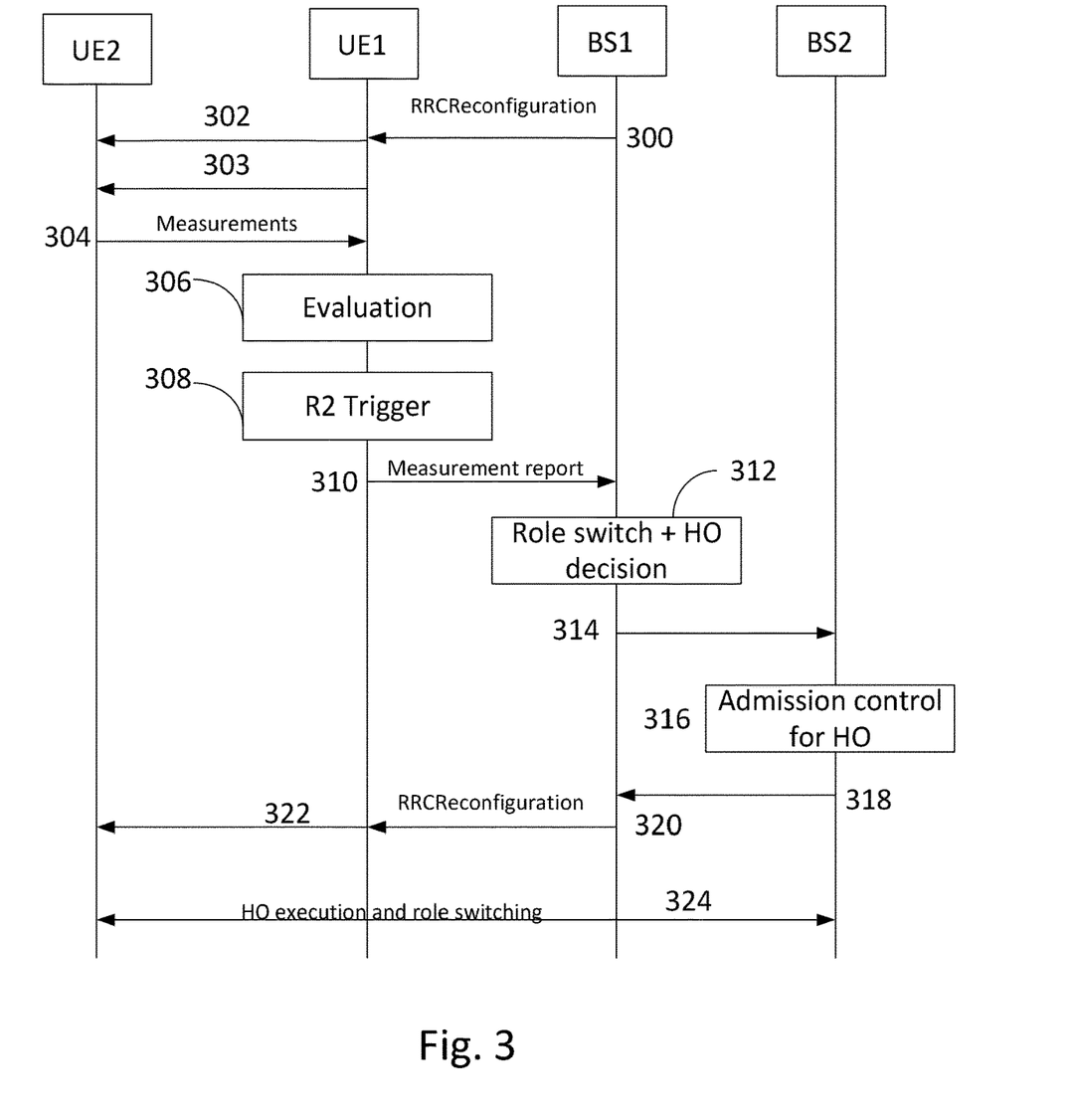
FIG. 3 is an example of a signaling chart illustrating inter-cell role switching.

FIG. 3 discloses another example of a role switching procedure. The example of FIG. 3 adds a second base station into the role switching procedure. The initial step is that of transmitting an RRCReconfiguration message from a first base station BS1 to a first user equipment UE1, step 300. Again, the message includes measurement reporting trigger events R1 and/or R2. The first user equipment then forwards, at least partially, the message to a second user equipment UE2, step 302. As in the example of FIG. 2 the measurement and reporting may be done using periodical or event-triggered reporting, or UE1 may transmit a request to report one or more measured values using a signal 303. If UE1 transmits the optional message 303, the message may contain just a request to report latest measured values or an explicit request to measure and periodically report current values. The first user equipment is a relay user equipment and the second user equipment is a remote user equipment. Then the second user equipment performs the necessary measurements. In the example of FIG. 3, the measurements may include P_s_UE2, which is the radio interface measurement between the serving base station and the second user equipment related to the serving cell. In the example of FIG. 3, the serving base station is the first base station. The measurements further include P1_n_UE2, which is the radio interface measurement between a second base station and the second user equipment related to a neighboring cell operated by the second base station.

UE1 performs the same measurements, or uses recently measured values, in order to get P_s_UE1 and P_n_UE1, and evaluates, step 306, the measurements in order to detect if conditions for R1 and/or R2 triggers are met. In the example of FIG. 3 the conditions for R2 have been met and R2 measurement reporting is triggered accordingly, 308. Then, a measurement report to the first base station is sent, in step 310, including the measurement results of the corresponding radio links related to event R2. However, instead of reporting the values, only an indication indicating that the condition is met can be sent to the first base station. The first base station decides, step 312, whether both a role switch and a handover are required for the best possible radio interface quality. The first base station then sends a handover request, in step 314, to the second base station for requesting a handover of the first and the second user equipment to the neighboring cell (aka target cell). The handover request comprises an indication that a role switch is necessary between the first and second user equipment, and thus that corresponding sidelink resources shall be configured for supporting relaying operation in the neighboring cell. The second base station performs admission control, in step 316, to check whether resources can be reserved for the first and second user equipment in the neighboring cell, including the required sidelink resources for relaying operation, and replies with an acknowledgment, in step 318, comprising information necessary for a combined handover of the first and second user equipment towards the neighboring cell. The second base station further includes in the acknowledgment sidelink resources for relaying UE1 (new remote user equipment) through UE2 (new relay user equipment) in the neighboring cell. The first base station relays the handover configuration information from the second base station to the first and second user equipment as an RRCReconfiguration message in steps 320 and 322. The RRCReconfiguration message (or another RRCReconfiguration message) further includes a role switch command for the first and second user equipment. As a consequence, after the handover to the neighboring cell, UE1 will be a remote user equipment and UE2 will be a relay user equipment, step 324. Finally, the first and second user equipment and the second base station execute the handover using the roles in accordance with the setup, step 324.

In the examples above, only two user equipment and base stations have been discussed. This is only for the sake of simplicity. One relay user equipment can serve one or more remote user equipment. Furthermore, the base stations need not be of same network technology, but there may be a handover between different network technologies having similar side link communication involving a relay and a remote user equipment. For example, a handover from an LTE to a 5G-network, or vice-versa, may be done.

The signaling examples disclose signaling that may be preferred in some implementations. However, some of the steps may not be necessary in order to trigger the role switch with/without handover in other implementations. For example, the configuration of event(s) R1 and/or R2 may not be necessary, and network may rely on the current measurement events/reports to collect the corresponding radio link connection information of different UEs to trigger role switch with/without handover. For example, each user equipment may report its measurement to network, independently. Thus, network may determine the role switch by considering the received measurement reports from different user equipment.

Figure 4:
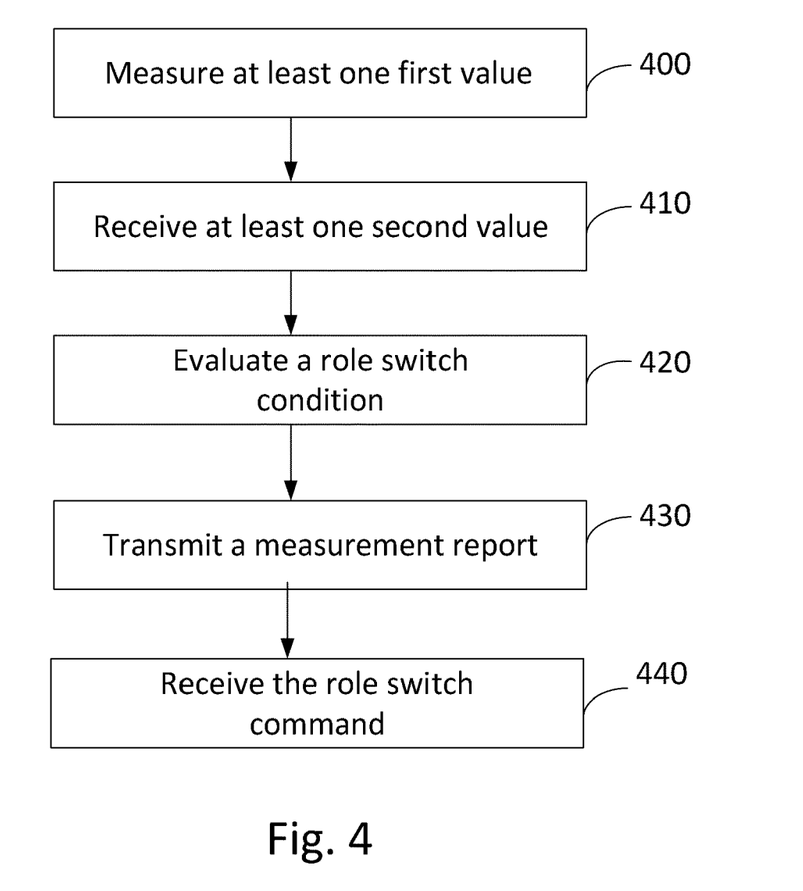
FIG. 4 is an example of a method for a user equipment in a relay mode.

In FIG. 4 an example of a method for a user equipment in a relay mode is disclosed. The user equipment may initiate the method by measuring at least one first value, step 400. Typically, the measuring comprises measuring at least the signal between the user equipment and a serving cell. However, commonly the user equipment also measures the signal between the user equipment and at least one neighboring cell. The measurement may be performed based on explicit request received from the serving cell or the user equipment may decide on measuring. Additionally, before the first step, a configuration message may have been received from the serving cell, for example, an RRCReconfiguration message, which includes additional triggers R1 and/or R2 for role switching.

Then, the user equipment receives at least one second value measured, step 410 from a user equipment in a remote mode. The relay user equipment may be receiving values from a plurality of remote user equipment. Furthermore, the remote user equipment may be transmitting the values periodically and they do not necessarily arrive concomitantly to the relay user equipment. Additionally, the user equipment may send a request/indication to one or more remote user equipment to perform the measurement of the communication channel between the user equipment and one or multiple base station(s), which may also include the serving base station. The measured and received values are then evaluated in order to detect if a condition for a role switch has been fulfilled, step 420.

If a condition for a role switch has been fulfilled, the user equipment transmits a measurement report to the base station, step 430. The measurement includes an indication that the condition for a role switch has been fulfilled.

Additionally, the measurement report may further include the measured values. Alternatively, the measurement report may only contain the measured values. If the base station decides that a role switch will be performed, the base station sends a role switch command to the user equipment. Finally, the user equipment receives the role switch command, step 440.

In the example method of FIG. 4, measurements between a user equipment and a base station have been discussed. However, it is possible to measure more than one communication channel when one or more user equipment involved are capable of communicating with two or more base stations. Accordingly, when evaluating, the request for a role switch may be accompanied with measurement results indicating a need for the handover. Thus, when necessary, the handover process is performed together with the role switching so that a fluent change in the communication channel can be achieved for all of the user equipment involved.

Figure 5:
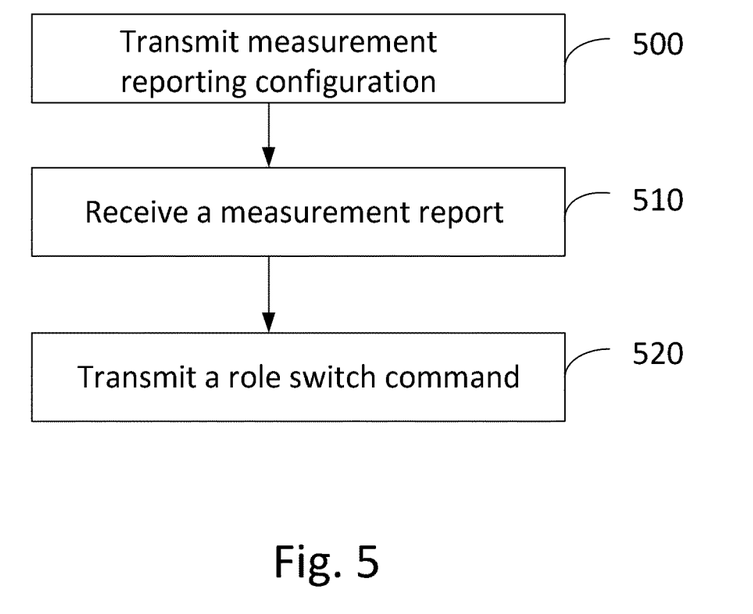
FIG. 5 is an example of a method for a base station.

In FIG. 5, an example of a method for a base station is disclosed. The example of FIG. 5 starts by transmitting measurement reporting configuration to a relay user equipment, step 500. The measurements may be carried out according to examples discussed above. Thus, they may include several measurements between different user equipment and base stations.

The base station receives a measurement report that is in accordance with transmitted measurement reporting configuration, step 510. If the measurement report indicates that there is a need for a role switch, then a role switch command may be sent step 520. Additionally, the base station may perform further evaluation of other additional criteria before deciding on role switch and transmitting a role switch command.

Figure 6:
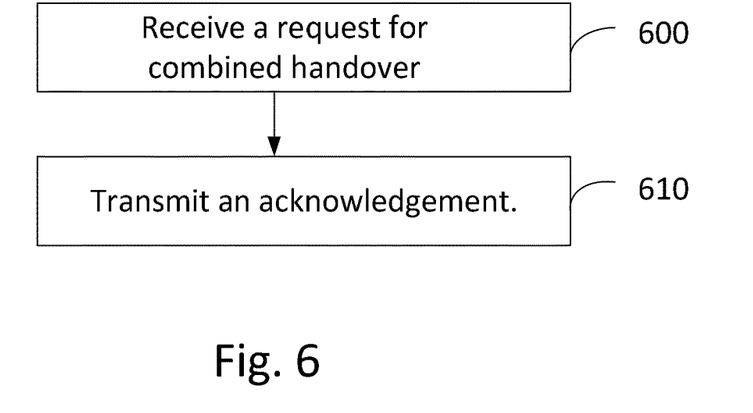
FIG. 6 is an example of a method for a base station.

In FIG. 6, an example of a method for a base station is disclosed. In the method, first, a request for a combined handover is received, step 600. The request is received from the base station currently serving the current relay user equipment. The request may further include an indication that a role switch is required. Then an acknowledgement is transmitted to the requesting base station, step 610. The acknowledgement comprises respective handover commands for the user equipment and the remote user equipment, and sidelink resources for sidelink communication between the user equipment and the remote user equipment.

As stated above, the components of the exemplary embodiments can include a computer readable medium or memories for holding instructions programmed according to the teachings of the present inventions and for holding data structures, tables, records, and/or other data described herein. A computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

As used in this application, the base station and/or user equipment may comprise a circuitry. The term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions and
 (c) hardware circuit(s) and/or processor(s), such as microprocessor(s) or a portion of microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

An example of an access architecture that may be applied may be e.g. a radio access architecture based on long term evolution advanced (LTE Advanced, LTE-A) or new radio (NR, 5G), without restricting, however, the example embodiments to such an architecture. It is obvious for a person skilled in the art that the example embodiments may also be applied to other kinds of communications networks having suitable means by adjusting parameters and procedures appropriately.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

It is obvious to a person skilled in the art that with the advancement of technology, the basic idea of the role management in relay communication may be implemented in various ways. The role management in relay communication and its example embodiments are thus not limited to the examples described above; instead they may vary within the scope of the claims.

What is claimed is:

1. A user equipment comprising:
    at least one processor; and
    at least one memory including computer program code, the at least one memory and the computer program code are configured to, with the at least one processor, cause the user equipment to:
    measure at least one first value, the at least one first value including a first measurement of a serving cell and a first measurement of a neighboring cell;
    receive at least one second measured value from a remote user equipment relayed by the user equipment, the at least one second measured value including a second measurement of the serving cell and a second measurement of the neighboring cell;
    evaluate a condition for a role switch between the user equipment and the remote user equipment, and for a combined handover of the user equipment and the remote user equipment to the neighboring cell, wherein the condition is when the second measurement of the neighboring cell is offset better than the first measurement of the serving cell and that the second measurement of the neighboring cell is offset better than the first measurement of the neighboring cell;
    in response to the condition being met, transmit a measurement report to a base station; and
    receive a role switch command from the base station.

2. The user equipment according to claim 1, wherein the at least one memory and the computer program code are further configured to, with the at least one processor, cause the user equipment to transmit the measured at least one first value and the received at least one second measured value in the measurement report.

3. The user equipment according to claim 1, wherein the at least one memory and the computer program code are further configured to, with the at least one processor, cause the user equipment to receive configuration information, wherein the configuration information comprises at least one parameter for evaluating the condition for the role switch between the user equipment and the remote user equipment.

4. The user equipment according to claim 1, wherein the at least one memory and the computer program code are further configured to, with the at least one processor, cause the user equipment to:
    transmit a request to the remote user equipment to report at least one measured value to the user equipment; and
    receive the at least one second measured value as a response to the request.

5. The user equipment according to claim 1, wherein the at least one first value and the at least one second measured value include at least one of the following: a measured power or quality of a reference signal of the serving cell; and a measured power or quality of a reference signal of the neighboring cell.

6. The user equipment according to claim 1, wherein the evaluation indicates the condition for the role switch between the user equipment and the remote user equipment when the second measurement of the serving cell performed by the remote user equipment is offset better than the first measurement of the serving cell performed by the user equipment.

7. A method for a user equipment, said method comprising:
    measuring at least one first value, the at least one first value including a first measurement of a serving cell and a first measurement of a neighboring cell;
    receiving at least one second measured value from a remote user equipment relayed by the user equipment, the at least one second measured value including a second measurement of the serving cell and a second measurement of the neighboring cell;
    evaluating a condition for a role switch between the user equipment and the remote user equipment, and for a combined handover to the neighboring cell, wherein the condition is when the second measurement of the neighboring cell is offset better than the first measurement of the serving cell and that the second measurement of the neighboring cell is offset better than the first measurement of the neighboring cell;
    in response to the condition being met, transmitting a measurement report to a base station; and
    receiving a role switch command from the base station.

* * * * *